March 19, 1940.  F. PIRANI ET AL  2,193,937
RAT TRAP
Filed Jan. 16, 1939  2 Sheets-Sheet 1
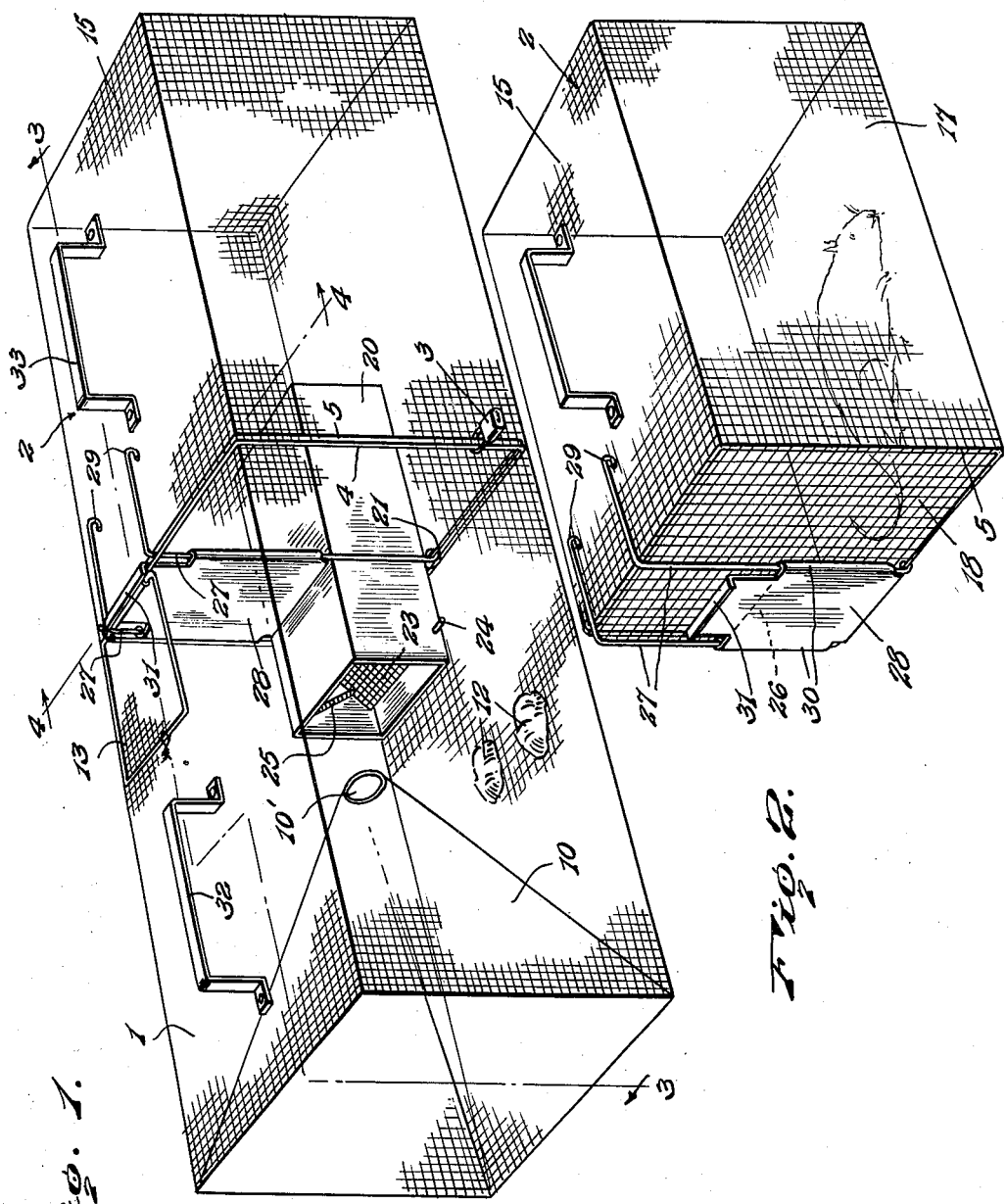
Inventors
F. Pirani.
S. Borgognoni.
By Lacey & Lacey, Attorneys

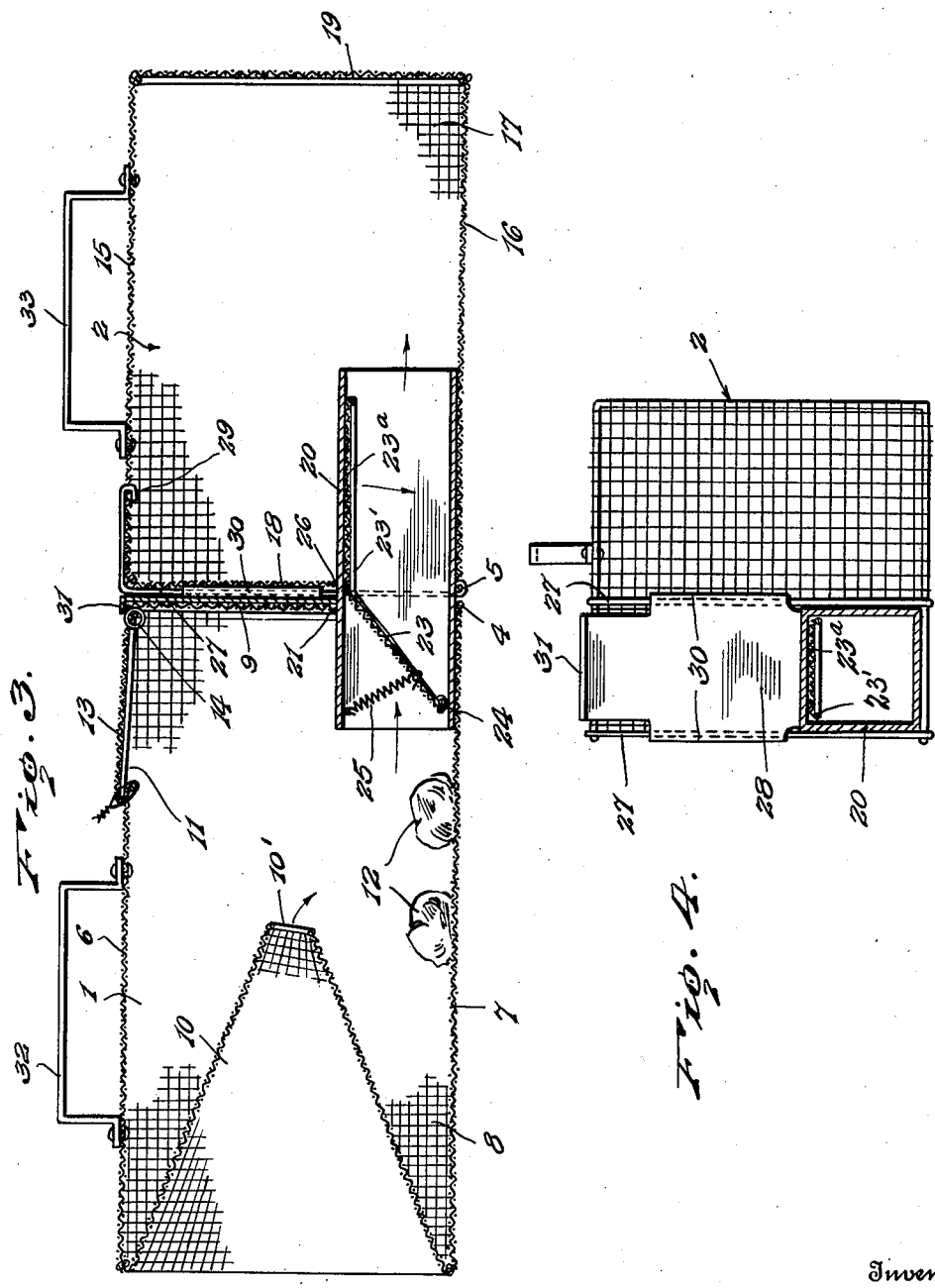

Patented Mar. 19, 1940

2,193,937

UNITED STATES PATENT OFFICE 2,193,937

RAT TRAP

Francesco Pirani and Serafino Borgognoni, Memphis, Tenn.

Application January 16, 1939, Serial No. 251,238

5 Claims. (Cl. 43—65)

This invention relates to a trap and more particularly to a trap for catching rats, but it is to be understood that its use is not restricted to catching rats as by making it of proper dimension it may be employed as means for catching other animals which may be either larger or smaller than a rat.

One object of the invention is to provide a trap consisting of an entrapping chamber and a confining chamber, the two chambers being in the form of separate cages which are secured in cooperating relation to each other but may be taken apart when an animal in the confining chamber is to be killed or otherwise disposed of.

Another object of the invention is to provide a trap wherein a tunnel extends from the entrapping chamber or cage into the confining chamber or cage, a guard being mounted in the tunnel in order to prevent an animal from returning to the entrapping chamber after passing through the tunnel into the confining chamber.

Another object of the invention is to provide the confining chamber with an entrance through which the tunnel of the entrapping chamber passes and a door for the entrance of the confining chamber which is slidably mounted for vertical movement, the door being held in a raised or opened position while the tunnel extends through the entrance into the confining chamber and being adapted to shift downwardly to a closed position when the confining chamber or cage is shifted away from the entrapping chamber or cage and the tunnel moves outwardly through the entrance of the confining chamber.

Another object of the invention is to so construct the entrapping chamber that, while an animal may readily enter the same, outward movement through the entrance will be prevented, the only means of escape from the entrapping chamber being through the tunnel which extends into the confining chamber and is guarded to prevent return movement from the confining chamber into the entrapping chamber.

Another object of the invention is to so construct the confining chamber that, if so desired, it may be employed as a cage in which an entrapped animal will be kept alive. It will thus be seen that the trap may be used by collectors and a number of confining cages employed with one entrapping cage, a new confining cage being set in place after an animal has been caught and the animal kept alive in the confining cage in which it is captured.

Another object of the invention is to provide a trap which is strong and durable and at the same time of light weight.

The invention is illustrated in the accompanying drawings, wherein:

Figure 1 is a perspective view of the complete trap, the confining cage being shown at the back of the entrapping cage and detachably secured thereto in cooperating relation to the entrapping cage, Figure 2 is a perspective view of the confining cage detached from the entrapping cage and showing its door in a closed position, Figure 3 is a longitudinal sectional view taken along the line 3—3 of Figure 1, and Figure 4 is a view taken along the line 4—4 of Figure 1 looking towards the confining cage and showing its door held in an opened position by the tunnel which establishes communication between the entrapping cage and the confining cage.

This improved trap consists briefly of an entrapping chamber or cage 1 and a confining chamber or cage 2 which is disposed back of the entrapping chamber and detachably secured in cooperating relation thereto, as shown in Figure 1, by padlocks or equivalent fasteners 3 disposed at opposite sides of the trap and engaging the end frames 4 and 5 of the two cages.

The forward cage or entrapping chamber 1 may be of any desired length, width and height, according to the type of animal to be caught, and has a top wall 6, a bottom 7, side walls 8 and a rear wall 9, these walls in the present illustration being all formed of strong wire mesh of sufficient thickness to prevent a rat from biting through the wire from which the wire mesh is formed and escaping from the entrapping chamber. An inwardly tapered substantially funnel-shaped inlet neck or entrance 10 which is also formed of wire mesh extends inwardly from the front of the entrapping cage with its inner end spaced from the top and bottom and side walls of the cage and formed with an opening 10' of sufficient size to permit the animal to pass through it and into the entrapping chamber or cage. In view of the fact that the inner end of the neck or entrance 9 is spaced from the walls and top and bottom of the cage, an animal after passing through the entrance and into the entrapping cage or chamber will be unable to escape through the entrance neck. An opening 11 is formed through the top wall of the entrapping cage in order that bait may be placed in the cage, as shown at 12, and this opening 11 is closed by a door 13 which is hinged at its front end to the upper portion of the frame 4, as shown at 14. A lock, similar to the padlock 3, may be employed to secure the door 13 in its closed position or a strand of wire or any other means desired may be employed for securing this door closed. If so desired, entrances corresponding to the entrance 10 may be provided at the sides of the cage 1 so that animals may enter from opposite sides of the trap as well as from the front.

The rear cage or confining chamber 2 is also formed of strong wire mesh and has a top 15, a bottom 16, side walls 17 and front and rear walls 18 and 19. This confining cage is of the same height and width as the entrapping cage, and when it is disposed back of the entrapping cage and secured by the padlocks 3, it cooperates with the entrapping cage to form a trap body having front and rear chambers, between which communication is established through the medium of a tunnel 20. This tunnel extends through an opening 21 formed in the rear wall 9 of the forward cage with its forward end portion extending into the forward cage where it is secured by a binding wire. A guard or door 23, which is also formed of wire mesh and may have a bordering frame 23' if so desired, is disposed within the tunnel 20 adjacent the forward end thereof and at its lower forward end is provided with a pivot pin or mounting rod 24 which has its end portion journaled through the side walls of the sheet metal tunnel. Therefore, the shield or door will be pivotally mounted for swinging movement from the raised position shown in Figure 3 to a lowered position which will permit an animal to walk through the tunnel and into the rear confining cage. A portion 23ª of the door extends longitudinally of the tunnel and is located close to the top thereof when the door is in its raised position. The door or guard is normally held in its raised position by a spring 25, and from an inspection of Figure 1, it will be readily understood that, while an animal by applying pressure to the shield or guard may force it downwardly to a lowered position and thus walk over it towards the rear end of the tunnel, the spring will swing the guard upwardly to its normal position as soon as the animal has moved rearwardly beyond the rear end of the lowered guard and the animal will then be prevented from moving forwardly through the tunnel beyond the guard and reentering the entrapping chamber once it has passed rearwardly through the tunnel and into the confining chamber. The portion 23ª makes it more difficult for an animal to pull the door downwardly and run over it back into the front chamber.

The front wall 18 of the rear cage or confining chamber is formed with an opening of the proper size to snugly receive the portion of the tunnel which projects rearwardly from the front cage, and at opposite sides of the opening 26 in the front wall of the rear cage there are mounted strands of stiff wire 27 which constitute tracks for a door 28. These strands of wire are secured at their lower ends to the lower cross bar of the frame 5 and have their upper end portions bent rearwardly along the top wall of the rear cage and secured to the wire mesh from which the top wall is formed, as shown at 29. The door 28 is of sheet metal and has its side portion formed with extensions which are rolled to provide sleeves 30 through which the wire strands or tracks 27 pass. Therefore, the door will be slidably mounted for vertical shifting movement from the raised or opened position shown in Figure 1 to the lowered or closed position shown in Figure 2. The upper portion of this door projects above the upper ends of the sleeves or tubes 30 and is bent forwardly to form a lip 31 constituting a handhold, by means of which the door may be easily grasped and shifted upwardly to its raised or opened position. This lip or flange 31 also constitutes means for overlapping the rear edge of the upper wall 6 of the front cage or entrapping chamber and supporting the door in its raised or opened position.

When this trap is in use, the rear cage is disposed back of the front cage and secured by the padlocks 3 in cooperating relation to the front cage with the tunnel 20 passing through the opening 26 of the rear cage and under the door 28 which will be disposed in its raised or opened position. Bait is placed in the front cage through the opening 11, and since the door 13 is secured in its closed position by a strand of wire or another padlock, an animal can only have access to the bait by entering the front cage or entrapping chamber through the entrance throat 10. When the animal enters the front cage, it will not be able to leave by the entrance through which it entered this cage and can only escape from the entrapping chamber through the tunnel 20. The guard or door 23 will be forced downwardly to its lowered position by the weight of the animal, and after the animal has moved rearwardly through the tunnel beyond the rear end of the lowered guard or door, the spring 25 will return this guard or door 23 to the raised position shown in Figure 3 and block return movement of the animal from the confining cage. It will, of course, be understood that more than one animal may enter the entrapping cage and be confined in the confining cage after passing through the tunnel. When the owner of the trap inspects the same and finds an animal in the confining chamber or cage, the padlocks 3 are removed and the confining chamber shifted rearwardly along the rearwardly projecting portion of the tunnel. As the rear end of this tunnel moves forwardly through the opening 26 in the front wall of the confining cage, the door 28 may be shifted downwardly to a closed position by pressure applied to the flange or lip 31 or the weight of this door may cause it to slide downwardly to the closed position as soon as the tunnel moves forwardly out of supporting engagement with its lower end. The closing of the door 28 will cause the animal to be confined in the rear cage and it may be killed and then removed through the opening 26, or if the animal is to be kept alive, it may be left in this cage which will constitute either a permannent or temporary cage for the animal. After the animal has been killed and removed from the confining chamber, the rear cage is replaced with its door 28 in the raised position and secured by the padlocks or if the animal is to be kept alive in this case, another cage will be applied to the entrapping cage and the trap will again be ready for use. The handles 32 and 33 extending upwardly from the cages permit them to be easily lifted and carried from one place to another.

Having thus described the invention, what is claimed as new is:

1. A trap comprising a forward entrapping cage having an entrance, a tunnel extending rearwardly from said entrapping cage, a rearwardly opening guard mounted in said tunnel and preventing return of a rodent to the entrapping cage through the tunnel, a rear confining cage disposed back of said entrapping cage and having its front wall formed with an opening through which said tunnel passes, means for releasably securing said cages in cooperating relation to each other with the tunnel extending into the confining cage, and a closure for the opening of the confining cage movable into and out of closing relation thereto.

2. A trap comprising an entrapping cage having an entrance, a tunnel extending through the rear wall of said entrapping cage and projecting rearwardly therefrom, a guard in said tunnel pivotally mounted at its lower end and movable rearwardly and downwardly to an open position, means yieldably holding said guard in a raised position to prevent forward movement of an animal through the tunnel and into the entrapping chamber, a confining chamber disposed back of said entrapping chamber and formed with an opening through which said tunnel passes, tracks extending vertically at opposite sides of the opening of the confining chamber, and a closure slidable vertically along said tracks from an open position to a closed position.

3. A trap comprising a forward entrapping chamber, a rear confining chamber disposed back of said entrapping chamber, means for releasably securing said confining chamber back of said entrapping chamber, a tunnel carried by the entrapping chamber and extending rearwardly therefrom into said confining chamber through an opening in the front wall of the confining chamber, a guard for said tunnel preventing movement of an animal forwardly through the tunnel from the confining chamber into the entrapping chamber, vertically disposed tracks at opposite sides of the opening in the front wall of the confining chamber, and a door for the opening of the confining chamber slidably carried by said tracks for movement from a raised position above the tunnel to a lowered position in closing relation to the opening in the front wall of the confining chamber, said door having a forwardly projecting member constituting a hand-hold for the door and adapted to overlap the rear end of the entrapping chamber and support the door in a raised position.

4. A trap comprising front and rear cages constituting a forward entrapping cage and a rear confining cage, said confining cage having a front wall formed with an opening, a tunnel carried by said entrapping cage and extending rearwardly therefrom and through the opening of the confining cage into the same, a rearwardly opening guard for said tunnel, strands of wire extending vertically at opposite sides of the opening in the front wall of the confining cage, and a door for the opening disposed between the wire strands and having its side portions formed into sleeves through which said strands pass to slidably mount the door for movement from a raised position over the tunnel to a lowered position in closing relation to the opening of the rear cage and the confining cage shifted rearwardly out of cooperating relation to the entrapping cage and the tunnel, said door having a lip engageable with the rear edge of the top wall of said forward entrapping cage for releasably retaining the door in raised position.

5. A trap comprising an entrapping cage, a confining cage, means for removably securing said confining cage in cooperating relation to said entrapping cage, a tunnel establishing communication between the confining cage and the entrapping cage, and a guard for said tunnel opening toward the confining cage and constituting means for preventing movement of an animal from the confining cage into the entrapping cage, said guard being pivotally mounted and yieldably held at an upward incline and having its upper portion provided with an extension extending towards the rear end of the tunnel near the top thereof when the guard is in its raised position.

FRANCESCO PIRANI.
SERAFINO BORGOGNONI.